Dec. 15, 1964 J. L. FLANAGAN ETAL 3,161,838
ELIMINATION OF OPERATIONALLY INDUCED NOISE FLUCTUATIONS IN ECHO SUPPRESSOR APPARATUS
Filed Sept. 12, 1962
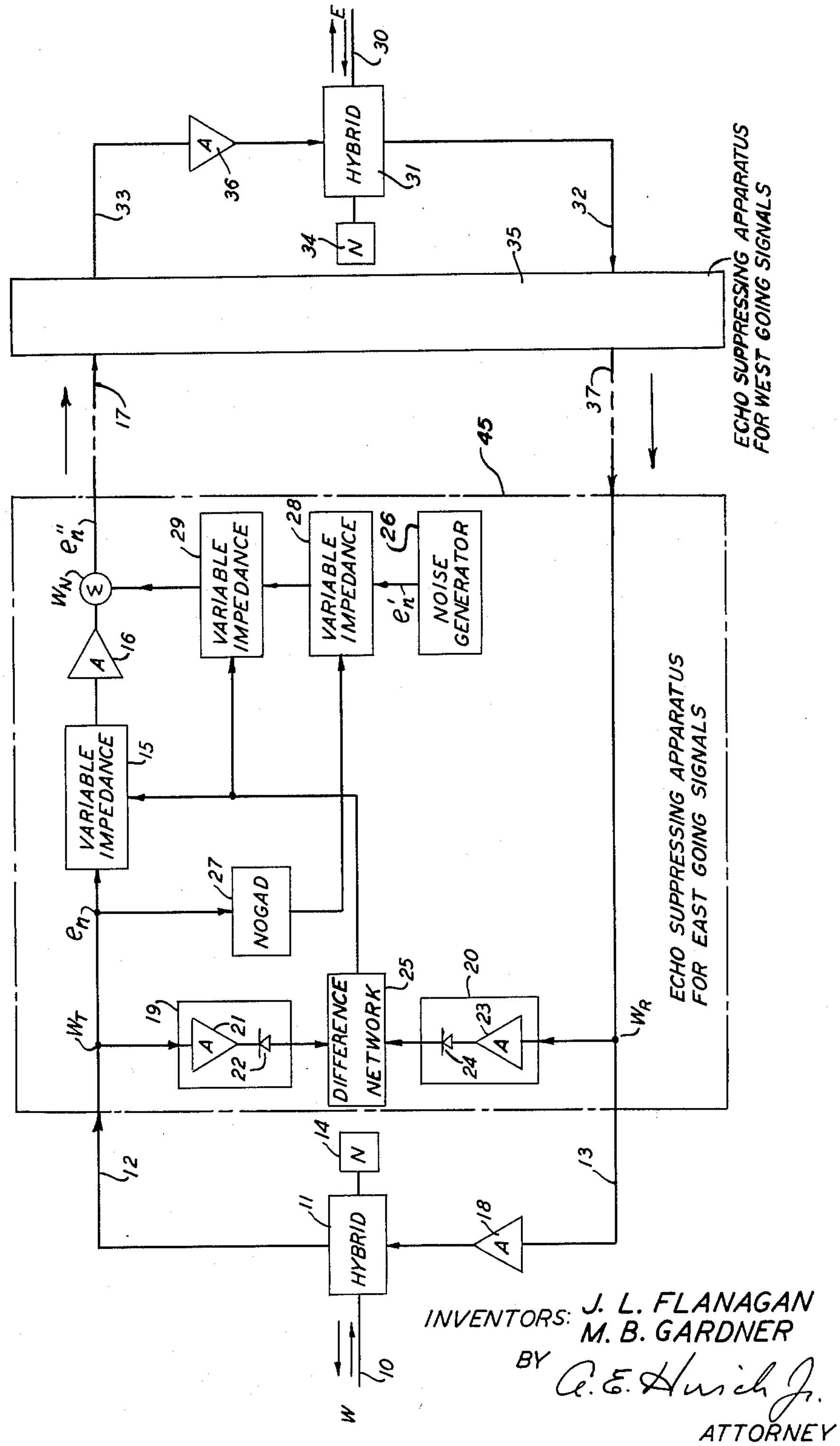
INVENTORS: J. L. FLANAGAN
M. B. GARDNER
BY A. E. Hirsch Jr.
ATTORNEY 3,161,838

ELIMINATION OF OPERATIONALLY INDUCED NOISE FLUCTUATIONS IN ECHO SUPPRESSOR APPARATUS

James L. Flanagan, Warren Township, Somerset County, and Mark B. Gardner, Chatham Township, Morris County, N.J., assignors to Bell Telephone Laboratories, Incorporated, New York, N.Y., a corporation of New York Filed Sept. 12, 1962, Ser. No. 223,161
7 Claims. (Cl. 333—2)

This invention relates to signal wave transmission systems and particularly to a method of and apparatus for eliminating operationally induced noise fluctuation in a signal wave transmission system that utilizes echo suppression apparatus.

In two-way telephone circuits it is common practice to interconnect local two-wire circuits, such as subscriber lines, by way of four-wire facilities which consist of two, unidirectional, two-wire circuits. At each two-wire to four-wire junction an arrangement known as a hybrid directs the outgoing signals over one channel and accepts incoming signals from the other. In a long distance circuit with appreciable transmission time delay, the transition from the two unidirectional paths to one bidirectional path normally gives rise to echoes or reflected transmissions. It is the usual practice to minimize such echo transmissions by means of signal-controlled apparatus which effectively disables one of the unidirectional paths while signal transmission is taking place over the other. Thus, echo signals are prevented from being transmitted back to the originating end and causing either a disturbance or singing. The disabling apparatus usually comprises means, such as an amplifier-detector control circuit, for diverting a portion of the signal from one path and utilizing it to control the open circuiting or short circuiting of the oppositely directed path, or to control the operational characteristics of an amplifier or attenuator in the oppositely directed path. Preferably, a differentially controlled, variable loss echo suppressor is employed by means of which the amount of attenuation introduced in the return path is dependent on the magnitude of the speech signals present both at the transmit side and the receive side of the terminal hybrid.

Echo suppressors have been perfected to a point where the introduction of loss is almost imperceptible to the talking subscriber provided that the return path is relatively free of noise. When noise is present in this path, however, the introduction of loss acts to eliminate noise as well as the echo. The net result is a speech-correlated variation of the noise so that the noise disappears and reappears in synchronism with suppressor operation. This not only positively identifies the presence of suppressor action, and hence transmission delay, but is considerably more annoying than the continued presence of existing noise during both the transmitting and silent periods of the talking subscriber.

It is the principal object of the invention to eliminate operationally induced noise fluctuations in a speech circuit that employs echo suppressor apparatus. It is another object of the invention to mask the operation of echo suppressors by insuring a relatively constant noise level in the circuit in which the suppressor is used.

In accordance with the present invention, the noise level at a receiver terminal of a two-way transmission system is maintained nearly constant despite suppressor operation by adding noise selectively to the circuit whenever the suppressor is in operation. The added noise constitutes a supplement to the noise normally on the line when the suppressor is in operation. It is a feature of the invention to adjust continuously noise signals developed in a noise generator or the like, tailor the noise level to the momentary circuit conditions, and correlate its addition to the circuit with the operation of the transmission path suppressor. In accordance with the invention, the noise generator is continuously adjusted in accordance with a measure of existing circuit line noise and its output is smoothly introduced in the circuit at the receiver side of the suppressor during those intervals when the suppressor is actuated.

These and other objects and features of the invention will be fully apprehended from a consideration of the single figure which depicts, in simplified block schematic form, a two-way transmission system which incorporates the invention.

The single figure illustrates, by way of a simplified block diagram, a signal transmission system interconnecting two terminal stations designated respectively E (East) and W (West). Two-way transmission is carried out in the following manner. A local circuit 10, which typically is a conventional two-wire telephone circuit connecting a subscriber to station W, is connected by hybrid network 11 to one end of a four-wire system that includes two separate two-wire circuits 12 and 13. In well known fashion, the hybrid network provides a one-way path for voice current from circuit 10 to outgoing circuit 12 and another one-way path for incoming currents from circuit 13 to local circuit 10. The impedance of the local circuit 10 is matched insofar as practical by a balancing network 14 associated with hybrid 11.

Outgoing currents in circuit 12 are passed by way of a variable impedance 15, and an amplifier 16 to the West-to-East transmission circuit 17, which may be of any desired sort. In the typical long distance circuit case, the transmission circuit may represent appreciable time delay. At the East station, currents from circuit 17 are delivered to echo suppressor apparatus 35 and then by way of circuit 33 and isolating amplifier 36 to hybrid network 31. Suppressor apparatus 35 is generally identical to suppressor apparatus 45 utilized at station W, which is illustrated in detail and which will be described presently, but it may, of course, be of any desired sort. Hybrid 31, terminated by network 34, transfers incoming signal currents from circuit 33 to subscriber circuit 30 and routes locally generated signals from circuit 30 to outgoing circuit 32. Output currents are passed by way of suppressor apparatus 35 to East-to-West circuit 37 and eventually to station W. Signal currents received at station W are delivered to various elements of the associated echo suppressor apparatus 45 and then by way of circuit 13 and isolating amplifier 18 to hybrid 11.

Ideally, all incoming currents from terminal E to station W are passed to the subscriber line 10; none is transferred to the outgoing circuit 12. Unfortunately, in actual practice, the balancing network, e.g., 14, provides only a partial match to line 10 and a portion of the incoming wave reaches line 12. In the absence of suppression, this portion is returned to the remote station as echo. In addition, echo components arise at any and all circuit discontinuities on line 10. These components are also reflected back to reach line 12 in a similar way. Depending on its magnitude and on the amount of delay (round trip transmission time), the resulting echo may be of considerable annoyance to the talking subscriber. Also, echo currents tend to circulate repeatedly around the loop and, if of sufficient magnitude, cause still further annoyance to both subscribers. Accordingly, echo suppressor apparatus is included in the transmission system.

One typical form of echo suppressor is shown in the illustrated system. Here, variable impedance 15 may be a continuously variable gain amplifier or it may be a switching element designed effectively to open or short circuit the signal path to any desired degree in response to external stimulus. Preferably, a variolosser, of any desired construction, which possesses a nonlinear suppression characteristic is employed. Amplifier 16 serves primarily to compensate for any insertion loss other than intended suppression of echo components, and to isolate the various circuit elements from each other.

Primary control of the impedance of variolosser 15 is provided by a differential network which includes detector 19 responsive to signals developed in outgoing circuit 12 (at point $W_T$) and detector 20 connected in, and responsive to, signals present in input circuit 13 (at point $W_R$). Typically, the detector elements include the series combination of an amplifier, and, if desired, a rectifier. Thus, detector 19 employs amplifier 21 and rectifier 22, and detector 20 employs corresponding elements 23 and 24. Signals developed by the detectors are compared in difference network 25, which may include a smoothing network, and, in dependence on the resultant of the comparison, a control signal is developed and passed to suppressor element 15. If a stronger signal is detected at point $W_R$, a signal is passed to variolosser 15 and transmission from subscriber W to subscriber E via path 17 is interrupted. If, on the other hand, subscriber W overrides speech from subscriber E, as by breaking in, signals developed in circuit 12 at point $W_T$ are detected and, being the stronger, serve to remove the blocking impedance of variolosser 15. If noise, which typically may have its origin anywhere in the signal path between W and $W_T$, is also present on path 12, the operation of variable impedance 15 also reduces the noise level on outgoing line 17 to subscriber E coincident with the suppression of echo. Subscriber E is thus made aware of suppressor action by such rising and falling of the noise level which can be considerably more objectionable than the presence of a steady noise. Accordingly, during those intervals when variolosser 15 is operative to open the circuit between subscriber W and subscriber E, it is in accordance with the invention to add sufficient noise to the circuit to maintain the circuit noise level perceived by subscriber E substantially constant.

Noise generator 26 is utilized to supply the supplementary noise. It may take any desired form. For example, it may comprise a source of so-called shot noise, but preferably employs a source of shot-plus-white noise since this has been found to be more nearly the sort of noise found in typical transmission circuits. Alternatively, to secure the best possible match between added noise and the quiescent line noise, a recording of actual noise present in the circuit may be employed. Typically, the playback from a loop of magnetically recorded tape may be utilized as the noise source. In any of its forms, the noise signal is supplied to the transmitting circuit at a point following the variable impedance of the echo suppressor. In the example shown in the figure, it is added to circuit 17 at point $W_N$; a point immediately following isolating amplifier 16.

The noise level of outgoing line 12 may vary greatly from connection to connection and time to time. Accordingly, nogad (Noise Operated Gain Adjusting Device) 27 is utilized to measure continuously the magnitude of the noise present in the circuit, e.g., at point $W_T$. Nogad 27 may be of any desired form but preferably is of the sort described in United States Patent 1,814,018 of S. B. Wright, and D. Mitchell. It is virtually insensitive to voice frequency signals because of its slow-buildup, quick-release characteristic. It responds, however, to steady noise and, by means of a rectifier or the like, develops a D.-C. potential proportional to noise level. The control signal developed by nogad apparatus 27 is utilized to control variable impedance 28 serially connected between noise generator 26 and point $W_N$. Variable impedance 28 may be a variolosser or the like. As the noise level increases in circuit 12, the magnitude of variable impedance 28 is proportionately reduced. Typically, the variation is a slow one; hence the impedance of network 28 varies at a relatively slow rate. Accordingly, sufficient noise is made available at the input to variable impedance 29 to facilitate maintaining the overall noise level in the outgoing circuit as nearly constant as possible.

In accomplishing its echo-suppressing function, variable impedance 15 attenuates both the signal and the noise existing at point $W_T$. It is in accordance with a further features of the invention to maintain a prescribed and constant noise power level on the outgoing line at point $W_N$ as the echo suppressor operates. Accordingly, the signal developed by difference network 25, which is utilized to actuate variable impedance 15, is also applied to variable impedance 29 serially connected between noise generator 26 and point $W_N$. Variable impedance 29 is a syllabic-rate variable impedance which operates more or less reciprocally with variable impedance 15. Thus, as the attenuation of variable impedance 15 is increased in response to a signal from network 25, the attenuation of variable impedance 29 is at the same time decreased, and the noise level at point $W_N$ is maintained at a nearly constant level. The attenuation and control characteristics of variable impedances 15, 28, and 29 must, of course, be suitably adjusted to effect the described action.

By way of illustraiton, one typical choice of operating characteristics may be described by the following relations. Let the circuit noise voltage at $W_T$ be represented by $e_n$; the noise voltage delivered by noise generator 26 by $e_n'$; and the outgoing circuit noise voltage at $W_N$ by $e_n''$. Let the gains of the variable impedances 15, 28, and 29 be denoted $VI_{15}$, $VI_{28}$, and $VI_{29}$, respectively, and that of amplifier 16 be denoted as $A_{16}$. All gains are taken here as positive real numbers, that is, they are equal to or greater than zero. The outgoing noise voltage at $W_N$ is therefore given by:

$$e_n''=(VI_{15}\cdot A_{16}\cdot e_n)+(VI_{28}\cdot VI_{29}\cdot e_n') \quad (1)$$

where the gains $VI_{15}$ and $VI_{29}$ may be controlled at the syllabic rate and gain $VI_{28}$ may be controlled relatively slowly in accordance with fluctuations in the circuit noise level at $W_T$. Because the noise sources $e_n$ and $e_n'$ are statistically independent and have zero mean (D.C.) values, the average noise power on the outgoing line is represented by $$\overline{e_n''^2}=(VI_{15}^2\cdot A_{16}^2\cdot \overline{e_n^2})+(VI_{28}^2\cdot VI_{29}^2\cdot \overline{e_n'^2}) \quad (2)$$

where the bar is used conventionally to denote time average.

Suppose nogad apparatus 27 always adjusts the gain $VI_{28}$ so that $$A_{16}^2\overline{e_n^2}=VI_{28}^2\overline{e_n'^2}=\overline{e^2} \quad (3)$$

where $\overline{e^2}$ is an average noise power proportional to $\overline{e_n^2}$. Then, the required gain of $VI_{28}$ is given by $$VI_{28}=A_{16}\left(\frac{\overline{e_n^2}}{\overline{e_n'^2}}\right)^{1/2} \quad (4)$$

or the gain of $VI_{28}$ is equal to $A_{16}$ times the ratio of the root-mean-square values of the noise voltages $e_n$ and $e_n'$.

If Equation 3 is satisfied, then from Equation 2 the gains $VI_{15}$ and $VI_{29}$ are related according to $$VI_{15}^2\overline{e^2}+VI_{29}^2\overline{e^2}=\overline{e_n''^2} \quad (5)$$

or $$VI_{15}^2+VI_{29}^2=\frac{\overline{e_n''^2}}{\overline{e^2}} \quad (6)$$

If a choice for the outgoing line noise level is made so that $$\overline{e_n''^2}=\overline{e^2}=A_{16}^2\overline{e_n^2} \quad (7)$$

the right-hand side of Equation 6 is equal to unity. The outgoing line steady noise level at $W_N$ will then always be proportional to the noise level at $W_T$, and the gains $VI_{15}$ and $VI_{29}$ will be related by $$VI_{15}=(1-VI_{29}^2)^{1/2} \qquad (8)$$

On the other hand, if desired, the outgoing line noise power level can, within certain limits, be maintained absolutely constant, independent of noise level fluctuations at $W_T$. In this case, $VI_{15}$ and $VI_{29}$ are related according to $$VI_{15}=\left(\frac{\overline{e_n''^2}}{\overline{e^2}}-VI_{29}^2\right)^{1/2} \qquad (9)$$

where, because gain values are taken as poistive real numbers, $$\left(\frac{\overline{e_n''^2}}{\overline{e^2}}-VI_{29}^2\right)\geq 0 \qquad (10)$$

or $$\frac{\overline{e_n''^2}}{\overline{e^2}}\geq VI_{29}^2 \qquad (11)$$

In this case $\overline{e_n''^2}$ is taken as the prescribed constant value, and the gains $VI_{15}$ and $VI_{29}$ are dependent upon $\overline{e^2}$, or upon $\overline{e_n^2}$. When Equations 9 and 11 are satisfied, therefore, the noise power level in the outgoing line is maintained absolutely constant regardless either of echo suppressor induced fluctuations or of natural fluctuations in $e_n$.

The above-described arrangements are merely illustrative of the application of the principles of the invention. Numerous other arrangements may be devised by those skilled in the art without departing from the spirit and scope of the invention.

What is claimed is:

1. In a system for suppressing echoes in a two-way intelligence signal circuit comprising incoming and outgoing one-way paths, means connected in said outgoing path for suspending transmission thereover when transmission is being effected over said incoming path, means for generating noise signals, means for continuously adjusting the level of the noise signals produced by said generator means to a level substantially equivalent to the noise level in said outgoing path in the absence of intelligence signals, and means for smoothly adding said adjusted noise signals to said outgoing path when transmission over said outgoing path is suspended.

2. A system for suppressing echoes in a two-way intelligence signal circuit which includes incoming and outgoing one-way paths, comprising, in combination means connected in said outgoing path for suspending transmission thereover when transmission is being effected over said incoming path, means for generating noise signals, means for providing a measure of the noise level in said outgoing path, means responsive to the amplitude of intelligence signals in at least one of said one-way paths and to said measure of noise level for continuously adjusting the level of the noise signals produced by said generator means to a level substantially equivalent to the noise level in said outgoing path in the absence of intelligence signals, and means for adding said adjusted noise signals to said outgoing path when transmission over said outgoing path is suspended.

3. The system according to claim 2 wherein said means for generating noise signals comprises means for continuously obtaining noise signals from a recording of noise signals typically present in said outgoing path in the absence of intelligence signals.

4. In a system for suppressing echoes in a two-way telephone circuit comprising incoming and outgoing one-way paths, adjustable means connected in said outgoing one-way path for regulating the transmission efficiency of said outgoing one-way path, means responsive to the amplitude of speech signals in at least one of said one-way paths for continuously adjusting said regulating means, means for generating noncoherent signals which are a facsimile of spurious signals in said telephone circuit in the absence of speech signals, means for adjusting the magnitude of said noncoherent signals to substantially the magnitude of said spurious signals in said circuit, and means for adding said adjusted noncoherent signals to said outgoing path during those periods when said outgoing path transmission efficiency is low.

5. Apparatus for suppressing echoes in a system having one path adapted for transmission in a receving direction and a second path adapted for transmission in a transmitting direction, comprising, voice operated means in circuit relation with said transmitting direction path for suspending transmission thereover when transmission is being effected in the receiving direction, noise generator means associated with said transmitting direction path, means associated with said transmitting direction path for adjusting the magnitude of noise signals produced by said generator means to a level equivalent to the noise level in said transmitting direction path in the absence of a voice signal, and means responsive to the action of said voice operated means for supplying noise from said generator means to said transmitting direction path during periods when transmission over said transmitting direction path is suspended.

6. In a two-way telephone system having one path adapted for transmission in a receiving direction and a second path adapted for transmission in a transmitting direction, voice operated means in circuit relation with said transmitting direction path for suspending transmission thereover when transmission is being effected in the receiving direction, noise generator means, and means associated with both of said transmission paths for supplying noise from said generator means to said transmitting direction path at a relatively low level during periods when transmission is being effected over said transmitting direction path, and at a level equivalent to the noise level in said transmitting direction path in the absence of a voice signal during periods when transmission over said transmitting direction path is suspended.

7. In a system for suppressing echoes in a two-way signaling circuit comprising incoming and outgoing one-way paths, first adjustable loss means connected in said outgoing one-way path, means responsive to the amplitudes of signals in at least one of said one-way paths for continuously adjusting said first adjustable loss means, means for generating noise signals, second and third adjustable loss means serially connecting said noise signal generating means to said outgoing one-way path, means responsive to the amplitude of speech signals in at least one of said one-way paths for adjusting said second adjustable loss means, means for providing a measure of the noise level in said outgoing one-way path, and means responsive to said measure of noise level for continuously adjusting said third adjustable loss means.

No references cited.